June 9, 1953   C. W. HEIJNE DEN BAK ET AL   2,641,023
METHOD OF PRODUCING ARTICLES FROM RUBBER
Filed Aug. 8, 1949
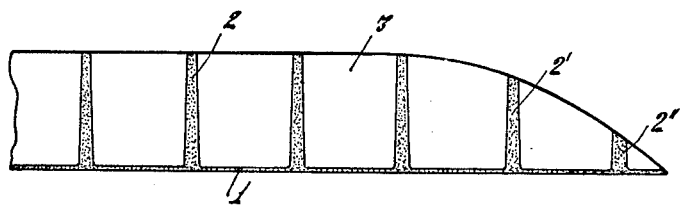
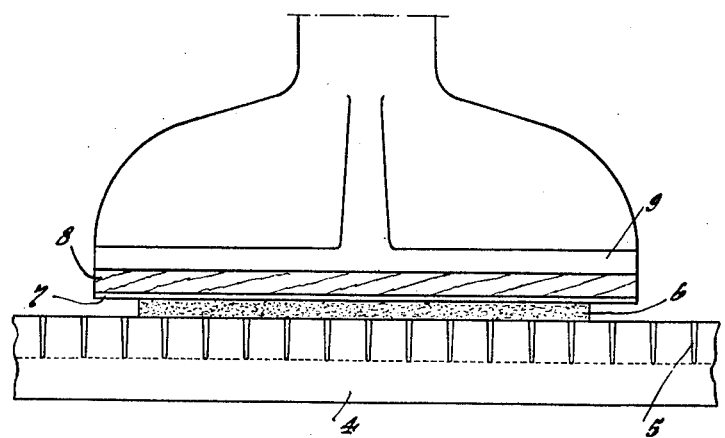

UNITED STATES PATENT OFFICE 2,641,023

METHOD OF PRODUCING ARTICLES FROM RUBBER

Carel Willem Heijne den Bak and Robert Ronald Laupman, Rhenen, Netherlands

Application August 8, 1949, Serial No. 109,134
In the Netherlands September 3, 1948

2 Claims. (Cl. 18—55)

This invention relates to a method of producing articles from rubber, rubber mixtures or like elastic material, which articles are provided with ribs or with projections of other shapes that gradually grow smaller at the edges of the article and thus furnish rounded-off edges.

The invention indicates a method by means of which rubber articles of the type described above can be provided with rounded-off edges in a strikingly simple manner, without it being necessary to make a separate mould for each product.

The method according to the invention is characterized in that on a mould which is preferably heated and which is provided with the necessary recessions for the ribs or for the other projections, a plate of unvulcanized (calendered) rubber is laid, which plate is subjected to pressure between the mould and a ram, which, if desired, may also be provided with recessions, care being taken that the rubber in the marginal portions of the plate has an opportunity of laterally escaping between the ram and the mould in such a manner that near the edges of the ram and the mould the pressure is smaller than closer to the centre, the quantity of rubber in the mould and/or the pressing time being so selected that the rubber does not entirely fill the recessions near the edges.

Thus articles having beautifully rounded-off edges are obtained in a simple manner. The shape of the roundings may be modified by varying the rate of heating and the pressure relatively to each other.

Thus a rapid heating and a low pressure will result in a steeper edge being produced, whereas the exertion of a high pressure on cold rubber in a moderately heated mould will yield a greater rounding.

Another advantage of the invention is that the mould need not comprise vent holes since the air can laterally escape from it.

The invention is illustrated hereinafter with reference to the drawing.

In this drawing:

Fig. 1 shows a portion of a rubber cushion produced according to the invention and Fig. 2 is a diagrammatic showing of the mould and the ram by means of which the method according to the invention is carried into effect.

In the present case the rubber cushion 1 comprises longitudinal ribs 2 and transverse ribs 3 so that substantially rectangular cells are formed. The rib 2' is lower than the rib 2 and in turn higher than the rib 2". The height of the ribs 3 decreases correspondingly in the marginal portions of the cushion.

The heated mould 4 (see Fig. 2) comprises grooves 5 corresponding to the ribs 2 and 3 to be formed therein. The unvulcanized rubber plate 6 has upright sides. The ram 9 can exert pressure on said plate via an aluminium plate 7 and a wooden plate 8. The upright sides of the rubber plate are free so that the material can escape in lateral direction when compressed. As a result the pressure along the marginal portions of the rubber plate automatically grows smaller so that towards the edges the material will penetrate less and less deep into the grooves owing to which the shape as shown in Fig. 1 is obtained without any further treatment.

Because the mould is heated the rubber is simultaneously vulcanized. The great advantage of the new method viz. the possibility of manufacturing articles of different sizes and shapes with one and the same size of mould, is manifest.

In the apparatus as shown in the drawing only the mould comprises recessions.

However, also the ram may be provided with recessions so that both at the upper and at the lower side of the article roundings will be formed.

Having now fully described and ascertained our said invention and the manner in which it is to be performed, we declare that what we claim is:

1. A method of producing articles from rubber and the like comprising supporting a slab of unvulcanized rubber at a plurality of spaced points on the lower surface thereof and the areas between the points being free of support, applying pressure to the upper surface of said slab while maintaining the peripheral edges of said slab between the upper and lower surfaces thereof free from pressure and simultaneously with the pressure applying heat to said slab, decreasing pressure near the edges of the slab to a lesser amount than that in the center of the slab by allowing rubber in the marginal portions of the slab to laterally escape, the final article thereby having a decreasing quantity of material and depth from the center thereof outwardly.

2. A method of producing articles from rubber and the like comprising supporting a plate of unvulcanized rubber on a plurality of crisscrossed grooves, applying heat to the rubber, applying pressure to the upper surface of said plate while maintaining the peripheral edge of the plate between the upper and lower surfaces thereof unrestricted, decreasing the pressure near the marginal edges of the plate to a smaller amount than the pressure closer to the center of the plate, by allowing rubber in the marginal portions of the plate to flow laterally, and forcing rubber into the grooves while allowing said flow whereby the rubber will have a greater depth near the center than near the marginal edges to form a gradually rounded off end surface on the finished article.

CAREL WILLEM HEIJNE DEN BAK.
ROBERT RONALD LAUPMAN.

References Cited in the file of this patent

UNITED STATES PATENTS

| Number | Name | Date |
| --- | --- | --- |
| 481,239 | McEwan | Aug. 23, 1892 |
| 542,452 | Thurber | July 9, 1895 |
| 1,645,604 | Lower | Oct. 18, 1927 |
| 1,911,765 | Matthews | May 30, 1933 |
| 2,194,364 | Minor | Mar. 19, 1940 |
| 2,338,685 | Dee | Jan. 4, 1944 |
| 2,357,513 | Harmon | Sept. 5, 1944 |